United States Patent
Lee et al.

(10) Patent No.: US 8,119,292 B2
(45) Date of Patent: Feb. 21, 2012

(54) NONAQUEOUS ELECTROLYTE FOR IMPROVING PERFORMANCE AND LITHIUM SECONDARY BATTERY COMPRISING THE SAME

(75) Inventors: Ho Chun Lee, Daejeon (KR); Tae Yoon Park, Daejeon (KR); Yong Su Choi, Cheongju-si (KR); Soo Jin Yoon, Gwangju-si (KR); Hong Kyu Park, Daejeon (KR); Hyun Min Jung, Daejeon (KR); Jeong Ae Ahn, Goyang-si (KR)

(73) Assignee: LG Chem, Ltd. (KR)

( * ) Notice: Subject to any disclaimer, the term of this patent is extended or adjusted under 35 U.S.C. 154(b) by 434 days.

(21) Appl. No.: 11/521,892

(22) Filed: Sep. 15, 2006

(65) Prior Publication Data

US 2007/0059606 A1    Mar. 15, 2007

(30) Foreign Application Priority Data

Sep. 15, 2005    (KR) .................. 10-2005-0086136

(51) Int. Cl.
H01M 10/40    (2006.01)

(52) U.S. Cl. ....................................... 429/326; 429/329

(58) Field of Classification Search .............. 429/231.95, 429/340, 326, 329, 337, 334; 252/62.1
See application file for complete search history.

(56) References Cited

U.S. PATENT DOCUMENTS

| 5,626,981 | A | 5/1997 | Simon et al. |
| 6,670,078 | B1 * | 12/2003 | Sato et al. ................ 429/340 |
| 2002/0197537 | A1 | 12/2002 | Kim et al. |
| 2004/0091786 | A1 | 5/2004 | Unoki et al. |
| 2004/0197667 | A1 | 10/2004 | Noh et al. |

FOREIGN PATENT DOCUMENTS

| JP | 0845545 A | 2/1996 |
| JP | 11-162511 | * 6/1999 |
| JP | 11162511 A | 6/1999 |
| JP | 11339850 A | 12/1999 |
| JP | 2004047131 A | 2/2004 |
| JP | 2001126764 A | 5/2004 |
| KR | 1020050068665 A | 7/2005 |
| WO | 02093679 A1 | 11/2002 |

OTHER PUBLICATIONS

Notification of CN Office Action; Date of Issuing: Sep. 11, 2009.
Jones,R.; "Physical and mechanistic organic chemistry"; Cambridge University Press; pp. 34-58, Jan. 1935.
March, J.; "Effects of Structure on Reactivity"; Advanced Organic Chemistry, Third Edition; pp. 237-254, Jan. 1963.
Korean Office Action dated Jul. 25, 2007 for Application No. 10-2006-0089114.
International Search Report dated Jan. 2, 2007 for Application No. PCT/KR2006/003678.

* cited by examiner

*Primary Examiner* — Cynthia H. Kelly
*Assistant Examiner* — Monique Wills
(74) *Attorney, Agent, or Firm* — Cantor Colburn LLP

(57) ABSTRACT

Disclosed is a lithium secondary battery comprising a cathode, an anode, an electrolyte and a separator, wherein the anode comprises an anode active material having a specific surface area of 3 $m^2/g$ or less, and the electrolyte comprises 0.1~6 parts by weight of a propane sultone-based compound based on 100 parts by weight of the electrolyte. The lithium secondary battery solves the problem of performance degradation caused by the use of an increased amount of a propane sultone-based compound required to form a SEI film on the surface of an anode upon the first charge cycle. Also, the lithium secondary battery can provide improved cycle characteristics and high-temperature storage characteristics.

6 Claims, 2 Drawing Sheets

NONAQUEOUS ELECTROLYTE FOR IMPROVING PERFORMANCE AND LITHIUM SECONDARY BATTERY COMPRISING THE SAME

This application claims the benefit of the filing date of Korean Patent Application No. 10-2005-0086136, filed on Sep. 15, 2005 in the Korean Intellectual Property Office, the disclosure of which is incorporated herein in its entirely by reference.

TECHNICAL FIELD

The present invention relates to a lithium secondary battery whose overall performance is improved by examining the interrelation between a propane sultone-based compound as a component for forming an electrolyte and the specific surface area of an anode active material.

BACKGROUND ART

Recently, as portable electronic instruments, such as portable computers, portable phones and camcorders, have been steadily developed so that they are downsized and lightened, lithium secondary batteries used as drive sources for the electronic instruments are also required to have a compact size and a light weight.

A lithium secondary battery includes a cathode, an anode and an electrolyte. Upon the first charge cycle, lithium ions are deintercalated from a cathode active material. Then, the lithium ions are intercalated into an anode active material such as carbon particles, and are deintercalated from the anode active material upon discharge. In this manner, lithium ions transfer energy while they reciprocate between the cathode and the anode, thereby allowing the battery to be charged/discharged. However, performance of a lithium secondary battery may be degraded by the deterioration of an anode during repeated charge/discharge cycles. Also, when a battery is exposed to high temperature conditions, safety of the battery may be degraded by the gas generation in the battery.

To solve the aforementioned problems, EU 683537 and JP 1996-45545 suggest a method for minimizing deterioration of an anode by using vinylene carbonate (referred to also as VC hereinafter) that forms a passivation layer on a carbon anode. Additionally, JP 1999-162511, JP 1999-339850 and JP 2004-47131 disclose the fact that propane sultone (referred to also as PS hereinafter) and a propane sultone-based compound can improve the long-term safety and lifespan characteristics of a battery.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Figure 1:
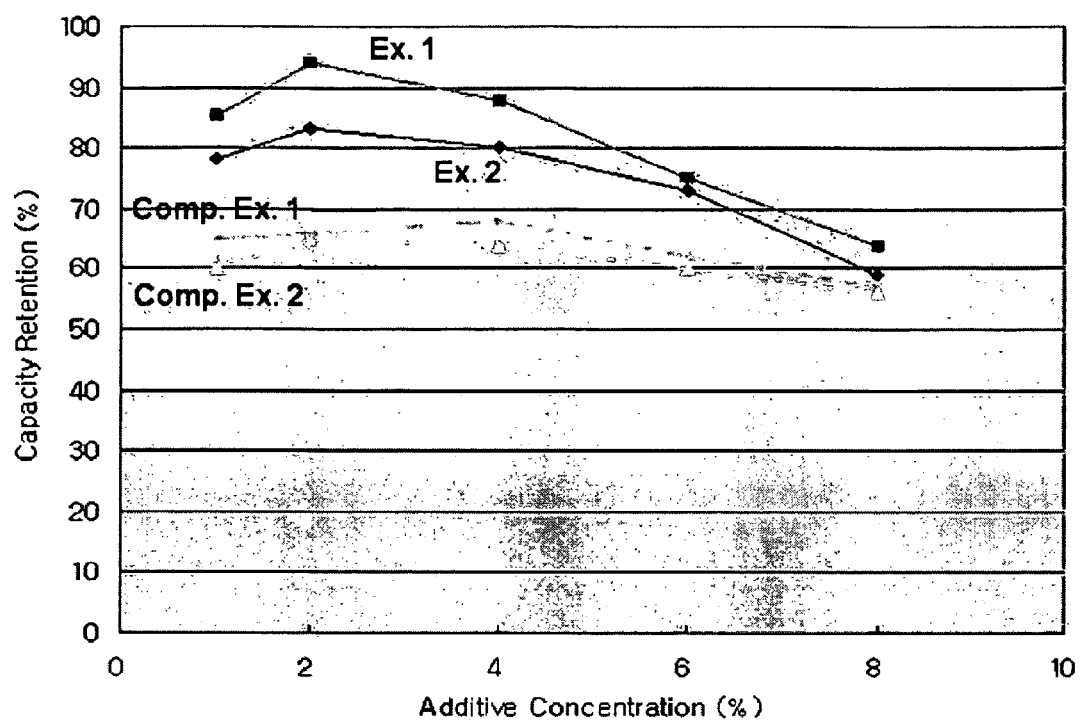
FIG. 1 is a graph showing variations in capacity retention of batteries as a function of the concentration of additive (a propane sultone-based compound) for electrolytes, when using the lithium secondary batteries according to Examples 1 and 2, and Comparative Examples 1 and 2.

The inventors of the present invention have discovered for the first time that when a propane sultone-based compound known to improve the long-term safety and lifespan characteristics of a battery is used as a component for forming an electrolyte, the amount of the propane sultone-based compound needed to form a passivation layer on the surface of an anode upon the first charge cycle increases in proportion to the specific surface area of the anode active material layer. We have also discovered that such an increase in the amount of the propane-sultone based compound ultimately results in degradation of the performance of a battery.

Therefore, the present invention has been made based on the above-mentioned findings. It is an object of the present invention to provide a lithium secondary battery whose overall performance is improved under optimal conditions by examining the interrelation between a propane sultone-based compound as a component for forming an electrolyte and the specific surface area of an anode active material.

According to an aspect of the present invention, there is provided a lithium secondary battery comprising a cathode, an anode, an electrolyte and a separator, wherein the anode comprises an anode active material having a specific surface area of 3 $m^2/g$ or less and the electrolyte comprises 0.1~6 parts by weight of a propane sultone-based compound based on 100 parts by weight of the electrolyte.

According to another aspect of the present invention, there is provided an electrode having a passivation layer partially or totally formed on a surface thereof, the passivation layer comprising a propane sultone-based compound substituted with an electron-withdrawing group (EWG) or a chemical reaction product thereof.

According to still another aspect of the present invention, there is provided a method of preventing a battery from being degraded in performance due to an increased amount of a propane sultone-based compound used therein, the method being characterized by using (a) an electrolyte comprising 0.1~6 parts by weight of a propane-sultone compound based on 100 parts by weight of the electrolyte; in combination with (b) an anode comprising an anode active material having a specific surface area controlled to 3 $m^2/g$ or less.

Hereinafter, the present invention will be explained in more detail.

It is known that a propane sultone (PS)-based compound used for preparing an electrolyte for batteries forms a passivation layer on the surface of an anode upon the first charge cycle, thereby contributing to improvement of the performance of a battery. Particularly, the amount of a propane sultone (PS)-based compound needed for forming a passivation layer increases in proportion to the specific surface area of an anode active material. When the proportion of a PS-based compound in an electrolyte increases in the aforementioned manner, an excessive amount of the PS-based compound may cause side reactions, resulting in a drop in the capacity of a battery.

The inventors of the present invention have recognized the above problem for the first time, and have conducted many studies to solve the problem by using a PS-based compound as a component for forming an electrolyte in such an amount that the PS-based compound causes no degradation of the performance of a battery. Herein, the amount of a PS-based compound defined in the present invention is less than the amount of a conventional electrolyte additive. For example, a PS-based compound may be used in an amount of 0.1~6 parts by weight according to a preferred embodiment of the present invention.

However, when a PS-based compound is used in such a low amount, a uniform solid electrolyte interface (SEI) film cannot be formed on the surface of an anode by the PS-based compound upon the first charge cycle. Moreover, it is not possible to obtain the effects provided by a propane sultone-based compound introduced as a component for forming an electrolyte to a sufficient degree. Such effects include the effects of improving the safety and lifespan characteristics of a battery.

Therefore, according to the present invention, the range of specific surface area of an anode active material, on which a SEI film is formed by the PS-based compound, is controlled while controlling the amount of the PS-based compound. This aims at realizing the effects provided by the PS-based compound introduced into an electrolyte to an optimum degree, as well as reducing the amount of the PS-based compound that may cause degradation of the performance of a battery when used in an increased amount. In fact, the range of specific surface area of an anode active material is controlled in such a manner that it is less than the conventional range (e.g. to 3 $m^2$/g or less). By doing so, even if a PS-based compound is used in a decreased amount, it is possible to maximize the effect of improving the overall performance of a battery, provided by the PS-based compound. It is a matter of course that the aforementioned problem related to degradation of the performance of a battery, occurring when a PS-based compound is used in a large amount, can be solved fundamentally according to the present invention.

One of the constitutional elements of the lithium secondary battery according to the present invention is a propane sultone (PS)-based compound. Any PS-based compound may be used with no particular limitation. Particularly, it is preferred to use a propane sultone-based compound substituted with at least one electron withdrawing group (EWG) so that it has a decreased reduction potential (an increased reduction potential in the case of a half cell).

Herein, there is no particular limitation in the electron withdrawing group (EWG), as long as it is capable of electron withdrawing. It is preferable that the EWG is an atomic group having a Hammett substituent constant ($\sigma_p$) greater than 0. A larger Hammett substituent constant ($\sigma_p$) is more preferred. (R. Jones, "Physical and Mechanistic Organic Chemistry", p. 35, Cambridge University Press, 1979; J. March, "Advanced Organic Chemistry", 3rd ed., Chap. 9, John Wiley and Sons, 1985). Non-limiting examples of the EWG that may be used in the present invention include halogen atoms (F, Cl, Br and I), cyano group (CN), nitro group ($NO_2$), trifluoromethanesulfonyl group, pentafluoroethane sulfonyl group ($SO_2C_2F_5$), pentafluorophenyl group ($C_6F_5$), methanesulfonyl group ($SO_2CF_3$), phenylsulfonyl group ($SO_2Ph$), acetyl group ($COCH_3$), methyl ester group ($COOCH_3$), or the like.

In a lithium secondary battery, during the first charge cycle, carbon particles, used as an anode active material, react with an electrolyte on the surface of the anode to form a solid electrolyte interface (SEI) film. The SEI film formed as described above serves to inhibit side reactions between carbonaceous materials and an electrolyte solvent and structural collapse of an anode material, caused by co-intercalation of an electrolyte solvent into the anode active material, and functions sufficiently as a lithium ion tunnel, thereby minimizing degradation in the performance of a battery. However, SEI films formed by a conventional carbonate-based organic solvent are weak, porous and coarse so that lithium ion conduction cannot be made smoothly. Thus, under these circumstances, the amount of reversible lithium decreases and irreversible reactions increase during repeated charge/discharge cycles, resulting in degradation in the capacity and cycle life characteristics of a battery. In order to solve the above problem, vinylene carbonate (VC) has been used according to the prior art. However, a passivation layer formed by VC shows a relatively high electric resistance and is decomposed with ease when exposed under high temperature conditions to generate gas such as carbon dioxide, resulting in degradation of the safety of a battery.

On the contrary, a PS-based compound containing an electron withdrawing group and showing a decreased reduction potential is used according to the present invention. Such compounds show a decreased reduction potential (an increased reduction potential in the case of a half cell) when compared to conventional PS-based compounds substituted with an electron donating group (EDG) or non-substituted, and thus are decomposed with ease under a relatively low initial voltage and show high reactivity with an anode. Therefore, even if a small amount of the PS-based compound according to the present invention is used in an electrolyte, it is possible to sufficiently improve the overall performance of a battery by the PS-based compound. More particularly, the PS-based compound can be decomposed upon the first charge cycle to form a firm and dense SEI film on the surface of an anode, thereby reducing the irreversible capacity of a battery. Ultimately, it is possible to improve the overall performance including capacity and lifespan characteristics of a battery.

It is thought that the reduction characteristics of a compound may be largely affected by the electronic effects in the compound. In other words, when a substituent introduced into the compound has electron donating ability, the compound has an increased electron density. Therefore, introduction of an electron donating group into an additive compound increases the reduction potential of the additive (decreases the reduction potential in the case of a half cell), and makes it difficult to perform reduction. On the other hand, when an electron withdrawing group is introduced into a PS-based additive compound as disclosed herein, the PS-based compound shows a decreased reduction potential (increased reduction potential in the case of a half cell), and makes it easier to perform reduction at an anode.

Additionally, a conventional lithium secondary battery shows rapid degradation in terms of performance, particularly under high temperature conditions. It is thought that this is because the SEI layer formed on the surface of an anode collapses rapidly, resulting in an increase in side reactions between an electrode and an electrolyte, gas generation caused by the decomposition of an electrolyte, and swelling of an electrode (increase in electric resistance of an electrode).

On the contrary, the PS-based compound substituted with an electron withdrawing group, which is contained in an electrolyte according to the present invention, allows rapid regeneration of a SEI film damaged under high temperature storage conditions even at a low voltage. Also, the PS-based compound according to the present invention can continuously maintain the SEI film because it is not decomposed under high temperature storage conditions, does not increase the internal pressure of a battery due to the gas generation, and causes no swelling of a battery (see FIG. 5). Further, the PS-based compound provides a battery with improved high temperature characteristics by reducing side reactions between an electrode and an electrolyte, which otherwise show an increased reactivity under high temperature.

The propane sultone-based compound substituted with an electron withdrawing group may be represented by the following Formula 1:

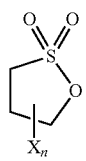

[Formula 1]

wherein X represents a substituent selected from the group consisting of halogen atoms, cyano group (CN), nitro group ($NO_2$), trifluoromethanesulfonyl group, pentafluoroethanesulfonyl group ($SO_2C_2F_5$), pentafluoro phenyl group ($C_6F_5$), methanesulfonyl group ($SO_2CF_3$), phenylsulfonyl group ($SO_2Ph$), acetyl group ($COCH_3$) and methyl ester group ($COOCH_3$); and n is an integer between 1 and 3.

Although the compound may be used in an amount controlled to improve the overall performance of a battery, it is used preferably in an amount of 0.1~6 parts by weight, and more preferably of 1~4 parts by weight based on 100 parts by weight of an electrolyte. If the compound is used in an amount less than 0.1 part by weight, it is not possible to sufficiently improve cycle characteristics and high temperature storage characteristics of a battery. On the other hand, if the compound is used in an amount greater than 6 parts by weight, an excessive amount of the PS-based compound may cause side reactions, resulting in a drop in the capacity of a battery, and an increase in the viscosity and a drop in the ion conductivity of an electrolyte. Thus, the battery may be degraded in terms of its overall performance.

The electrolyte for a battery, to which the compound is added, comprises conventional components widely known to one skilled in the art, for example, an electrolyte salt and an organic solvent.

The electrolyte salt that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_3^-$, $N(CF_3SO_2)_2^-$, $C(CF_2SO_2)_3^-$ and combinations thereof. A lithium salt is particularly preferred. Non-limiting examples of the lithium salt include $LiClO_4$, $LiCF_3SO_3$, $LiPF_6$, $LiBF_4$, $LiAsF_6$, $LiN(CF_3SO_2)_2$, and mixtures thereof.

The organic solvents that may be used in the present invention include conventional solvents known to those skilled in the art, such as cyclic carbonates and/or linear carbonates. Non-limiting examples of the organic solvents include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethyoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate or a mixture thereof. Halogen derivatives of the above organic solvents may also be used.

The other constitutional element forming the lithium secondary battery according to the present invention is an anode active material having a specific surface area (3 $m^2/g$ or less), which is less than the conventional specific surface area (greater than 3 $m^2/g$) of an anode active material. Preferably, the specific surface area of the anode active material is 2 $m^2/g$ or less, for example, 0.1~2 $m^2/g$. The above range of specific surface area is determined in order to reduce the amount of a PS-based compound in an electrolyte, required to form a SEI layer, by decreasing the specific surface area of an anode active material, and thus to prevent a battery from being degraded in terms of performance due to the use of a large amount of a PS-based compound. Also, as the specific surface area of an anode active material decreases, the size of the anode active material particles increases, resulting in a decrease in the reactivity of the active material with an electrolyte. Therefore, it is possible to improve the thermal stability of a battery.

There is no particular limitation in the material, shape, etc. of the anode active material, as long as the anode active material satisfies the above condition of specific surface area, and conventional anode active materials known to those skilled in the art may be used in the present invention. Non-limiting examples of the anode active materials include carbon, lithium metal or alloys, and other metal oxides capable of lithium intercalation/deintercalation and having a potential less than 2V based on lithium, such as $TiO_2$, $SnO_2$, or the like. Carbonaceous materials are preferred.

When the electrolyte containing the above additive compound is used, a solid electrolyte interface (SEI) film is formed partially or totally on the surface of an anode via electrical reduction upon the first charge cycle. Herein, the SEI film may comprise a propane sultone-based compound, preferably a propane sultone-based compound substituted with an electron withdrawing group, or a chemical reaction product thereof.

When, the electrode is subjected to charge/discharge cycles in the presence of the above electrolyte, the PS-based compound contained in the electrolyte can form a SEI film on the surface of an electrode active material together with reversible lithium ions. In a variant, the PS-based compound may be coated on the surface of an electrode active material or may be used in combination with other materials forming the electrode. In another variant, the PS-based compound may be coated onto the surface of a preliminarily formed electrode. In still another variant, an electrode is subjected to electrical reduction before the assemblage of a unit cell, while it is dipped into the same electrolyte as the electrolyte for a battery, thereby providing an electrode having a preformed SEI film, and then the resultant electrode may be used to assemble a battery.

When a battery is manufactured by using an anode having a preformed SEI film as described above, a smaller amount of the PS-based compound is required to form a SEI film. Thus, it is possible to prevent a battery from being degraded in terms of performance due to the use of an increased amount of the PS-based compound. Also, it is possible to improve the overall performance of a battery due to the use of the PS-based compound.

The lithium secondary battery according to the present invention includes a battery rechargeable by lithium intercalation/deintercalation. Particular examples of the lithium secondary battery include a lithium metal secondary battery, a lithium ion secondary battery, a lithium polymer secondary battery or a lithium ion polymer secondary battery.

The lithium secondary battery according to the present invention may be obtained by using a method generally known to one skilled in the art. For example, an electrode assembly is formed by using a cathode, an anode and a porous separator interposed between both electrodes, and then the electrolyte is injected thereto.

The electrode according to the present invention may be formed by applying an electrode active material on a current collector according to a method known to one skilled in the art. In one embodiment of such methods, electrode slurry containing a cathode active material or an anode active material is applied onto a current collector, followed by drying. At this time, a small amount of conductive agent and/or binder may be added, as necessary.

Particularly, cathode active materials may include any conventional cathode active materials currently used in a cathode of a conventional secondary battery. Particular non-limiting examples of the anode active material include: lithium transition metal composite oxides, including $LiM_xO_y$ (wherein M=Co, Ni, Mn, $Co_aNi_bMn_c$), such as lithium manganese composite oxides (e.g. $LiMn_2O_4$), lithium nickel oxides (e.g. $LiNiO_2$), lithium cobalt oxides (e.g. $LiCoO_2$), or other oxides containing other transition metals partially substituting for manganese, nickel and cobalt; chalcogenide (e.g. manganese dioxide, titanium dioxide, molybdenum dioxide, etc.); or the like. Among these examples, $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, $a+b+c=1$), $LiNi_{1-Y}Co_YO_2$, $LiCo_{1-Y}Mn_YO_2$, $LiNi_{1-Y}Mn_YO_2$ (wherein $0\leq Y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ (wherein $0<Z<2$), $LiCoPO_4$, $LiFePO_4$ or a mixture thereof is particularly preferred.

Preferably, the separator is a porous separator. Non-limiting examples of the separator that may be used include a polypropylene-based, polyethylene-based or polyolefin-based separator, or a porous separator, into which inorganic particles are incorporated.

There is no particular limitation in the outer shape of the lithium secondary battery obtained in the above-described manner. The lithium secondary battery may be a cylindrical, prismatic, pouch-type or coin-type battery.

Further, the present invention provides a method of preventing a battery from being degraded in performance due to an increased amount of a propane sultone-based compound used therein, the method being characterized by using (a) an electrolyte comprising 0.1~6 parts by weight of a propane-sultone compound based on 100 parts by weight of the electrolyte; in combination with (b) an anode comprising an anode active material having a specific surface area controlled to 3 $m^2/g$ or less.

BEST MODE FOR CARRYING OUT THE INVENTION

Reference will now be made in detail to the preferred embodiments of the present invention. It is to be understood that the following examples are illustrative only and the present invention is not limited thereto.

EXAMPLE 1

Manufacture of Lithium Secondary Battery $LiCoO_2$ was used as a cathode active material, and a conductive agent and a binder were added to NMP (N-methyl-2-pyrrolidone) along with the cathode active material to form cathode slurry. Then, the cathode slurry was coated onto an aluminum (Al) collector to provide a cathode.

As anode active material, artificial graphite having a specific surface area of 1.5 $m^2/g$ was used, and a conductive agent and a binder were added to NMP along with the anode active material to form the anode slurry. Then, the anode slurry was coated onto a copper (Cu) collector to provide an anode.

As an electrolyte, EC/EMC-based solution containing 1M $LiPF_6$ dissolved therein was used, and fluoropropane sultone (FPS, X=F) was added to the electrolyte in an amount of 1, 2, 4, 6, and 8 parts by weight.

A polyolefin-based separator was interposed between the cathode and the anode obtained as described above to form an electrode assembly, and the electrolyte was injected thereto to provide a pouch type battery.

EXAMPLE 2

A lithium secondary battery was provided in the same manner as described in Example 1, except that PS was used in the electrolyte instead of FPS.

EXAMPLE 3

A lithium secondary battery was provided in the same manner as described in Example 1, except that cyanopropane sultone (CNPS, X=CN) was used in the electrolyte instead of FPS.

COMPARATIVE EXAMPLE 1

A lithium secondary battery was provided in the same manner as described in Example 1, except that artificial graphite having a specific surface area of 4 $m^2/g$ was used as an anode active material.

COMPARATIVE EXAMPLE 2

A lithium secondary battery was provided in the same manner as described in Example 1, except that artificial graphite having a specific surface area of 4 $m^2/g$ was used as an anode active material and PS was used in the electrolyte.

COMPARATIVE EXAMPLE 3

A lithium secondary battery was provided in the same manner as described in Example 1, except that artificial graphite having a specific surface area of 4 $m^2/g$ was used as an anode active material and CNPS was used in the electrolyte.

EXPERIMENTAL EXAMPLE 1

Measurement of Reduction Potential of Additive

To determine the reduction potential of each additive at an anode, a coin type half cell was fabricated in a conventional manner by using artificial graphite as a cathode, Li foil as an anode and EC/EMC-based solution containing 1M $LiPF_6$ dissolved therein as an electrolyte. To the electrolyte, fluoropropane sultone (FPS), cyanopropane sultone (CNPS) or propane sultone (PS) were added in an amount of 2 wt %. The coin type half cell was subjected to cyclic voltammetry in a range between 1.5 V and 1 mV at a scanning rate of 0.1 mV/sec. The following Table 1 shows the peak voltage in the reduction of each additive.

After the measurement, it was shown that propane sultone having an electron withdrawing group introduced thereto has a higher reduction potential (in the case of a half cell), when compared to a non-substituted propane sultone (see Table 1).

TABLE 1

| Additive | Peak Voltage in Reduction (V vs Li) |
|---|---|
| FPS | 1.2 |
| CNPS | 1.15 |
| PS | 1 |
| null | 0.6 |

EXPERIMENTAL EXAMPLE 2

Determination of SEI Film Formed on Anode by Reaction of Additive

The following experiment was performed to determine the formation of an SEI film from the additive for electrolytes according to the present invention on the surface of an anode.

The coin type half cells obtained from the above Examples were subjected to three charge/discharge cycles under 0.2 C at 23° C., and then the anode was collected from each cell in a discharged state. The anode was analyzed by DSC (differential scanning calorimetry). The following Table 2 shows the initial heat emission temperatures of the thermal collapse of SEI films. A higher initial heat emission temperature indicates higher thermal stability of the SEI film formed on the anode.

After the experiment, initial heat emission temperature caused by the thermal collapse of the SEI film on an anode varied depending on the kind of the additive for electrolytes. This demonstrates that the additive for electrolytes according to the present invention participates in the formation of the SEI film on an anode.

TABLE 2

| Additive | Initial Heat Emission Temperature (° C.) |
|---|---|
| FPS | 126 |
| CNPS | 122 |
| PS | 123 |
| null | 107 |

EXPERIMENTAL EXAMPLE 3

Evaluation of Cycle Characteristics of Lithium Secondary Battery

The following experiment was performed to evaluate the performance of the lithium secondary battery according to the present invention.

The lithium secondary batteries of Examples 1 and 2, comprising an anode having a controlled specific surface area and an electrolyte containing an additive in a controlled amount, were used as samples. The lithium secondary batteries of Comparative Examples 1 and 2, comprising an anode having the conventional range of specific surface area, were used as controls. Each battery was subjected to repeated charge/discharge cycles at an electric current of 0.5 C in a voltage range between 4.2V and 3V. The capacity retention of each battery is shown in FIG. 1 as a function of the amount of an additive (a PS-based compound) for electrolytes.

It was shown that as the amount of a propane sultone-based compound increases, a battery shows rapid degradation of performance (see FIG. 1). This demonstrates that use of an increased amount of a propane sultone-based compound in an electrolyte causes side reactions by the excessive amount of the propane sultone-based compound, resulting in degradation of the overall performance of a battery, for example, a drop in the capacity of a battery.

After the experiment, the batteries of Comparative Examples 1 and 2, comprising an electrolyte containing an additive (a PS-based compound) in a controlled amount and an anode having the conventional range of specific surface area, showed significantly decreased capacity retention after 200 cycles. On the contrary, the batteries of Examples 1 and 2, comprising an electrolyte containing an additive (a PS-based compound) in a controlled amount and an anode having a range of specific surface area controlled to be smaller than the conventional range of specific surface area, showed excellent capacity retention even after 200 cycles (see FIG. 1). This indicates that the amount of an additive for electrolytes required to form a SEI film has an interrelation with the specific surface area of an anode. In brief, when a PS-based compound is used in a small amount as compared to the specific surface area of an anode, the SEI film cannot be formed sufficiently, thereby causing continuous degradation of the performance of a battery.

More particularly, the battery of Example 1 using a propane sultone-based compound having an electron withdrawing group showed a more significant improvement in terms of performance. This demonstrates that the propane sultone-based compound substituted with an electron withdrawing group is decomposed more easily upon the first charge cycle to form a firm and dense passivation layer, thereby providing excellent cycle characteristics at room temperature.

EXPERIMENTAL EXAMPLE 4

High-Temperature Storage Characteristics of Lithium Secondary Battery

The following experiment was performed to evaluate high-temperature storage characteristics of the lithium secondary battery according to the present invention.

Figure 2:
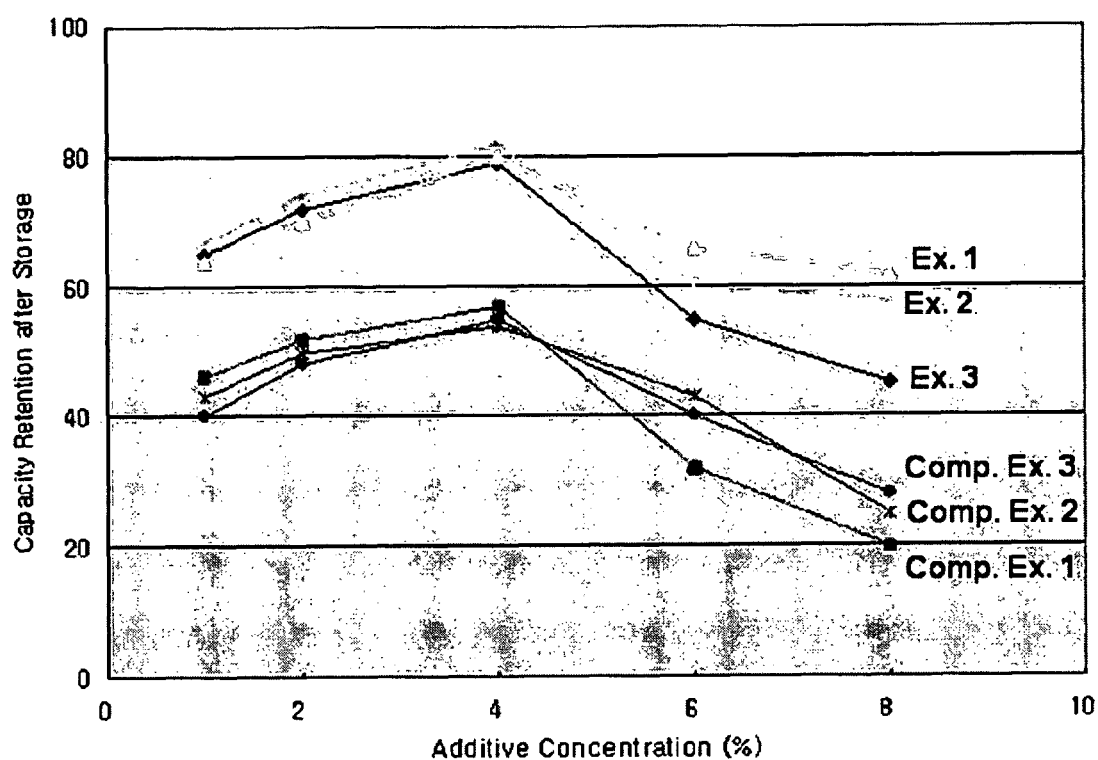
FIG. 2 is a graph showing high-temperature (80° C.) storage characteristics of batteries as a function of the concentration of additive (a propane sultone-based compound) for electrolytes, when using the lithium secondary batteries according to Examples 1~3, and Comparative Examples 1~3.

The lithium secondary batteries of Examples 1~3, comprising an anode having a controlled specific surface area and an electrolyte containing an additive in a controlled amount, were used as samples. The lithium secondary batteries of Comparative Examples 1~3, comprising an anode having the conventional range of specific surface area, were used as controls. Discharge capacity was measured for each battery after storing the batteries at 80° C. for 30 days. FIG. 2 shows a ratio of the discharge capacity of each battery after the storage to that of each battery before the storage.

After the experiment, the batteries of Comparative Examples 1~3, comprising an electrolyte containing an additive (a PS-based compound) in a controlled amount and an anode having the conventional range of specific surface area, showed poor high-temperature storage characteristics. On the contrary, the batteries of Examples 1~3, comprising an electrolyte containing an additive (a PS-based compound) in a controlled amount and an anode having a range of specific surface area controlled to be smaller than the conventional range of specific surface area, showed excellent high-temperature storage characteristics even after 200 cycles (see FIG. 2).

As also can be seen from Experimental Example 1, when the amount of the propane sultone-based compound in the electrolyte is greater than 6 parts by weight, the battery causes rapid degradation of performance (see FIG. 2). Since the amount of the propane sultone-based compound increases in proportion to the specific surface area of the anode active material, the above results demonstrate that use of an increased amount of a PS-based compound causes rapid degradation of the performance of a battery.

Therefore, it can be seen from the above experimental results that the lithium secondary battery according to the present invention has excellent high-temperature storage characteristics.

INDUSTRIAL APPLICABILITY

As can be seen from the foregoing, the lithium secondary battery according to the present invention comprises a small amount of a PS-based compound as an additive for electrolytes, and thus solves the problem of performance degradation caused by the use of an increased amount of a PS-based compound. Also, the lithium secondary battery comprises an anode active material having a specific surface area less than the conventional range of specific surface area in addition to such a controlled amount of additive. Therefore, it is possible to improve the lifespan characteristics and high-temperature storage characteristics of a battery.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A lithium secondary battery comprising:
a cathode, an anode, an electrolyte, and a separator,
wherein the anode comprises an anode active material having a specific surface area of 3 m²/g or less, and the electrolyte comprises 1~4 parts by weight of a propane sultone-based compound substituted with at least one electron withdrawing group (EWG), based on 100 parts by weight of the electrolyte, and
wherein the propane sultone-based compound substituted with an electron withdrawing group (EWG) is a compound represented by the following Formula 1:

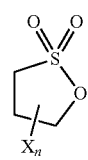

Formula 1 wherein X represents a substituent selected from the group consisting of cyano (CN), nitro (NO₂), trifluoromethanesulfonyl (SO₂CF₃), pentafluoroethane sulfonyl (SO₂C₂F₅), methanesulfonyl (SO₂CH₃), phenylsulfonyl (SO₂Ph), acetyl (COCH₃), and methyl ester (COOCH₃), and n is an integer between 1 and 3.

2. The lithium secondary battery according to claim 1, wherein the anode has a specific surface area of 2 m²/g or less.

3. The lithium secondary battery according to claim 1, wherein the propane sultone-based compound is a compound capable of forming a solid electrolyte interface (SEI) film on the anode of the battery via electrical reduction, and shows a decreased reduction potential due to the electron withdrawing group (EWG) introduced thereto.

4. The lithium secondary battery according to claim 1, wherein the anode active material is a carbonaceous material.

5. An electrode having a passivation layer partially or totally formed on a surface thereof, the passivation layer comprising:
a propane sultone (PS)-based compound substituted with an electron-withdrawing group (EWG) or a chemical reaction product thereof,
wherein the propane sultone-based compound substituted with an electron withdrawing group (EWG) is a compound represented by the following Formula 1:

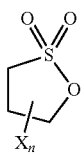

Formula 1 wherein X represents a substituent selected from the group consisting of cyano (CN), nitro (NO₂), trifluoromethanesulfonyl (SO₂CF₃), pentafluoroethane sulfonyl (SO₂C₂F₅), methanesulfonyl (SO₂CH₃), phenylsulfonyl (SO₂Ph), acetyl (COCH₃), and methyl ester (COOCH₃), and n is an integer between 1 and 3,
wherein the propane sultone (PS)-based compound substituted with an electron-withdrawing group (EWG) or the chemical reaction product thereof is contained in an amount of 1 to 4 parts by weight, based on 100 parts by weight of an electrolyte.

6. A lithium secondary battery comprising the electrode as defined in claim 5 as an anode.

* * * * *